(12) United States Patent     (10) Patent No.: US 7,473,149 B2
Mizokawa     (45) Date of Patent: Jan. 6, 2009

(54) WATERCRAFT PROPULSION SYSTEM AND OPERATING METHOD

(75) Inventor: Takashi Mizokawa, Shizuoka-ken (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/841,652

(22) Filed: Aug. 20, 2007

(65) Prior Publication Data

US 2008/0064273 A1     Mar. 13, 2008

(30) Foreign Application Priority Data

Sep. 11, 2006    (JP)   .............................. 2006-246081

(51) Int. Cl.
     *B63H 21/17*      (2006.01)
     *B63H 21/22*      (2006.01)
     *B63H 21/21*      (2006.01)

(52) U.S. Cl. ................................. 440/6; 440/1; 440/84

(58) Field of Classification Search ...................... 440/6
See application file for complete search history.

(56) References Cited

U.S. PATENT DOCUMENTS 7,147,523 B2 * 12/2006 Mori et al. ..................... 440/3

2003/0085062 A1 * 5/2003 Bowen ....................... 180/65.1
2006/0025025 A1 * 2/2006 Kitani et al. .................... 440/6

FOREIGN PATENT DOCUMENTS

JP     2004-257294     9/2004
JP     2006-036086     2/2006

OTHER PUBLICATIONS

U.S. Appl. No. 11/841,510, filed Aug. 20, 2007, entitled Watercraft Propulsion System and Operating Method.

* cited by examiner

*Primary Examiner*—Jesús D Sotelo
(74) *Attorney, Agent, or Firm*—Knobbe, Martens, Olson & Bear, LLP

(57) ABSTRACT

A watercraft propulsion system has a control lever for giving instructions regarding operating mode and output power from a source of driving force. A controller sets a propeller driving mode according to instructions given from the control lever. In an embodiment, an electric motor and an engine are included in the propulsion system, and the controller simultaneously controls both the engine and motor based on inputs from the control lever and sensed conditions.

20 Claims, 14 Drawing Sheets

WATERCRAFT PROPULSION SYSTEM AND OPERATING METHOD

CROSS-REFERENCE TO RELATED APPLICATIONS

The present application is based on and claims priority under 35 U.S.C. § 119 to Japanese Patent Application Serial No. 2006-246081, filed on Sep. 11, 2006, the entire contents of which are expressly incorporated by reference herein.

BACKGROUND

1. Field of the Invention

The present invention relates to a watercraft propulsion system and its operating method. More specifically, it relates to a hybrid-type watercraft propulsion system having an engine and an electric motor as a source of driving force for a propeller.

2. Description of the Related Art

Japanese Publication No. 2004-257294 presents an example of a cruising method using so-called "acceleration assist," in which the driving power of an engine is assisted by the driving power of an electric motor for the purpose of driving a power transmission device. In cruising with such acceleration assist, the output power of the electric motor is adjusted based on the operating speed of the control lever, throttle opening speed of the engine, the operating time of the control lever, and the engine rotation variation time.

This technique attempts to ensure consistency of the engine operation with the electric motor operation on the assumption that the engine is always running while under way. Therefore, such technique cannot prevent the exhaust gas and the noise emission during the trolling operation.

Japanese Publication No. 2006-036086 presents an example in which a throttle grip that can be operated in freely rotatable manner is provided on a bar handle, and a control switch is provided in the vicinity of the throttle grip. By operating the control switch, running and stopping of the engine and the electric motor, as well as the rotational direction of the electric motor, can be controlled. Also, the rotational speeds of the electric motor and engine can be adjusted according to the turning operation of the throttle grip.

However, two control means: the control switch and the throttle grip, must be used for controlling the running, stopping, and rotational speeds of the engine as well as the electric motor. Operation of such control means is troublesome.

SUMMARY OF THE INVENTION

Accordingly, there is a need in the art for a watercraft propulsion system and corresponding operating method by which an engine and an electric motor can be controlled easily, and at the same time the exhaust gas and the noise during the trolling operation can be suppressed.

In accordance with one embodiment, the present invention provides a watercraft propulsion system comprising an engine and an electric motor that are both configured to selectively drive a propeller. The system comprises a user instruction device and a controller. The user instruction device is configured so that a user can select a first or second forward operating mode and an output power within the selected operating mode. The controller is adapted to receive a signal from the instruction device indicative of the desired operating mode and output power and to control the engine and electric motor accordingly. The controller is configured to employ the electric motor to drive the propeller when the first forward operating mode is selected, and the controller is configured to employ the engine to drive the propeller when the second forward operating mode is selected.

In one such embodiment, the user instruction device comprises a control lever, and the position of the control lever simultaneously determines the selected operating mode and selected output power within the selected mode. In one embodiment, the control lever is rotatable about an axis, and the position of the control lever is controllable by one hand.

In a preferred embodiment, the first forward operation mode is a trolling mode, and the second forward operation mode is a regular cruising mode. In one such embodiment, the controller is configured so that a variation of the electric motor output power corresponding to a change in position of the control lever in the trolling mode is less than a variation of the engine output power corresponding to a change in position of the control lever in the regular cruising mode.

Another embodiment additionally comprises a battery for storing electric power to be supplied to the electric motor, a charge level detector configured to detect a charge level in the battery, and an electricity generator adapted to be driven by the engine to charge the battery. The charge level detector communicates with the controller, and the controller is configured to determine based on the detected charge level whether the engine should be run during the first forward operating mode in order to charge the battery. In one such embodiment, a connection between the engine and the propeller is disengaged in the first forward operating mode.

Another embodiment additionally comprises an engine speed detector adapted to communicate an engine speed to the controller, wherein the controller is configured to couple the engine to the propeller only when the engine exceeds a threshold engine speed. In another embodiment, the controller is configured to run the electric motor in addition to the engine during the second forward operation mode when the engine speed is below a second threshold value.

In yet another embodiment, the engine is operated at idle when the electric motor is driven by electric power from the battery in the first forward operating mode.

A yet further embodiment additionally comprises a battery for storing electric power to be supplied to the electric motor, a charge level detector configured to detect a charge level in the battery, and an electricity generator adapted to be driven by the engine to charge the battery, wherein the charge level detector communicates with the controller. The controller is configured so that if the detected charge level is below a threshold level when the electric motor is driving the propeller in the first forward operating mode, the controller restricts the output power of the electric motor.

A still further embodiment additionally comprises a battery for storing electric power to be supplied to the electric motor, a charge level detector configured to detect a charge level in the battery, and an electricity generator adapted to be driven by the engine to charge the battery, wherein the charge level detector communicates with the controller. The controller is configured so that if the detected charge level is below a threshold level when the electric motor is driving the propeller in the first forward operating mode, the controller simultaneously runs the electricity generator to charge the battery.

In accordance with another embodiment, A watercraft propulsion system comprises an engine and an electric motor that are both configured to selectively drive a propeller. The system comprises a user instruction device, a drive source switch, and a controller. The user instruction device is configured so that a user can select a first or second forward operating mode and an output power within the selected operating mode. The controller is adapted to receive a signal from the instruction device indicative of the desired operating mode and output power and to control the engine and electric motor accordingly. When the drive source switch is in a first position the controller is configured to employ the electric motor to drive the propeller when the first forward operating mode is selected and to employ the engine to drive the propeller when the second forward operating mode is selected. When the drive source switch is in a second position the controller is configured to employ the engine to drive the propeller when either the first or second forward operating mode is selected.

In accordance with yet another embodiment, the present invention provides a method for operating a watercraft propulsion system comprising an engine and an electric motor that are both configured to selectively drive a propeller and which are controlled by a controller. The method comprises receiving a user instruction selecting one of at least a first and second forward operating mode and selecting an output power in the selected operating mode. If the first forward operating mode is selected, the method comprises sensing a battery charge level and, if the sensed battery charge level is above a threshold level, driving the propeller with the electric motor. If the second forward operating mode is selected, the method directs driving the propeller with the engine.

In another embodiment, if the first forward operating mode is selected and the sensed battery charge level is below a second threshold, the electric motor is operated at a restricted output power level.

A further embodiment additionally comprises an electricity generator powered by the engine, wherein if the first forward operating mode is selected and the sensed battery charge level is below a second threshold, the engine is operated to drive the electricity generator simultaneously as the electric motor drives the propeller.

DETAILED DESCRIPTION OF PREFERRED EMBODIMENTS

Now, embodiments of this invention will be described below with reference to the drawings.

Figure 1:
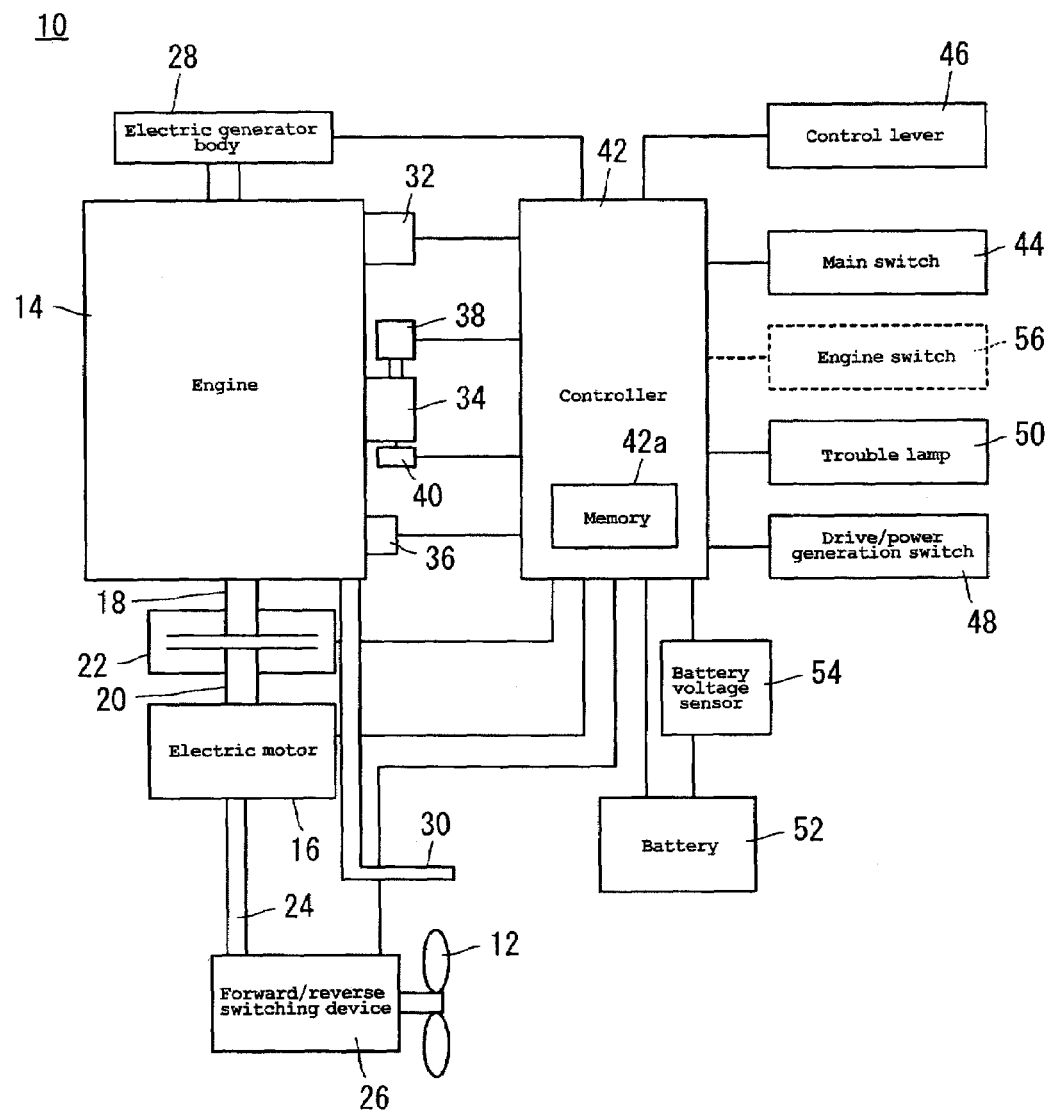
FIG. 1 is an illustration showing a watercraft propulsion system according to one embodiment.

Referring to FIG. 1, a watercraft propulsion system 10 according to an embodiment is of a hybrid type having a propeller 12, an engine 14 as a source of driving force for the propeller 12, and an electric motor 16. The illustrated embodiment is a motor-centered type watercraft propulsion system in which the electric motor 16 is disposed between the engine 14 and the propeller 12. It should be noted that the watercraft propulsion system 10 and 10a (that will be described later) may be configured as an outboard motor or as a part of the watercraft.

In the illustrated watercraft propulsion system 10, an electromagnetic clutch 22 is provided between a crankshaft 18 of the engine 14 and a rotor 20 of an electric motor 16. The crankshaft 18 and the rotor 20 preferably are connected or separated by turning on or off the electromagnetic clutch 22. A driveshaft 24 is joined to the rotor 20 of the electric motor 16, and the driveshaft 24 is connected to the propeller 12 via a forward/reverse switching device 26. The rotational direction of the propeller 12 is determined by the forward/reverse switching device 26. The forward/reverse switching device 26 preferably is a common dog clutch as can be found on outboard motors, for instance, that is operated by an electric actuator.

An electric generator body 28 used for engine generation preferably is disposed on the top of the engine 14, and the electric generator body 28 is provided on the upper end of the crankshaft 18. Also, an exhaust pipe 30, an ignition device 32 for ignition of the engine 14, a throttle valve 34 for adjusting the amount of fuel delivered to the engine 14, and an engine speed sensor 36 for detecting the engine rpm (revolutions per minute) preferably are provided on the engine 14. A throttle motor 38 for driving the throttle valve 34, and a throttle opening sensor 40 for detecting the throttle valve 34 preferably are provided on the throttle valve 34. The exhaust pipe 30 preferably is provided so that the exhaust opening is located in the rearward of the propeller 12.

The illustrated electric motor 16, the electromagnetic clutch 22, the forward/reverse switching device 26, the electric generator body 28, the ignition device 32, the engine speed sensor 36, the throttle motor 38, and the throttle opening sensor 40 are connected to a controller 42. Further, a main switch 44 for starting (ON) or stopping (OFF) the operation of the watercraft propulsion system 10, a control lever 46 for giving instructions on the types of operating mode as well as on the amount of output power from the source of driving force, a drive/power generation switch 48 for selectively setting the driving function or power generation function, a trouble lamp 50 to make a trouble annunciation, a battery 52 composed of a 24V battery, for instance, and a battery voltage sensor 54 for detecting the voltage of the battery 52 preferably are connected to the controller 42.

In the illustrated embodiment, the controller 42 receives signals indicating the opening of the throttle valve 34 by the throttle opening sensor 40, signals indicating the rpm of the engine 14 by the engine speed sensor 36, ON/OFF signals by the main switch 44, lever position signals indicating the type of operating mode and the amount of output power from the source of driving force by the control lever 46, setting signals indicating driving function or power generation function by the drive/power generation switch 48, and signals indicating the battery voltage by the battery voltage sensor 54. In addition, an electric power obtained by the engine generation at the electric generator body 28 charges up the battery 52 via the controller 42.

The controller 42 preferably gives ignition instructions to the ignition device 32, driving signals to the throttle motor 38, ON/OFF signals to the electromagnetic clutch 22, driving signals and the electric power from the battery 52 to the electric motor 16, setting signals of forward or reverse to the forward/reverse switching device 26, and lamp lighting signals to the trouble lamp 50.

Additionally, the controller 42 preferably includes a memory 42a. A program for implementing the operations shown in FIGS. 4 through 10 preferably is stored in the memory 42a. Further, operation data, a first prescribed value and a second prescribed value that are to be compared with the rpm of the engine 14, a specified value to be compared with the battery voltage, a first threshold and a second threshold, table data showing the corresponding relation between the position of the control lever 46 and the output power from the source of driving force, and so on preferably are stored in the memory 42a.

In the present embodiment, the control lever 46 represents an instruction means. The controller 42 represents a setting means and a first to a third determination means. The battery voltage sensor 54 represents the charge level detecting means. The engine speed sensor 36 represents the rpm detecting means.

In the present specification, the term "trolling mode" refers to the condition in which a watercraft is propelled forward in dead slow speed between 0 knot and several knots per hour. The "regular cruising mode" refers to the condition in which a watercraft is propelled in speed range greater than the trolling mode.

Next, referring to FIGS. 2 and 3, the relationship between the position of the control lever 46 and the types of operating mode or the output power from the source of driving force will be described in accordance with one embodiment.

Figure 2:
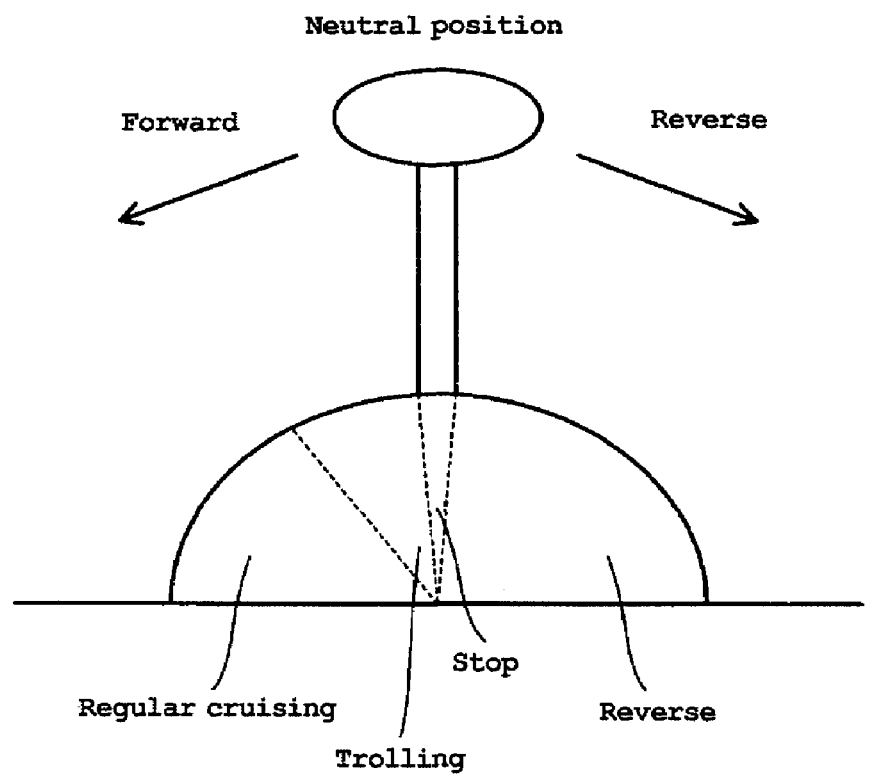
FIG. 2 is an illustration showing an embodiment of a control lever.
Figure 3:
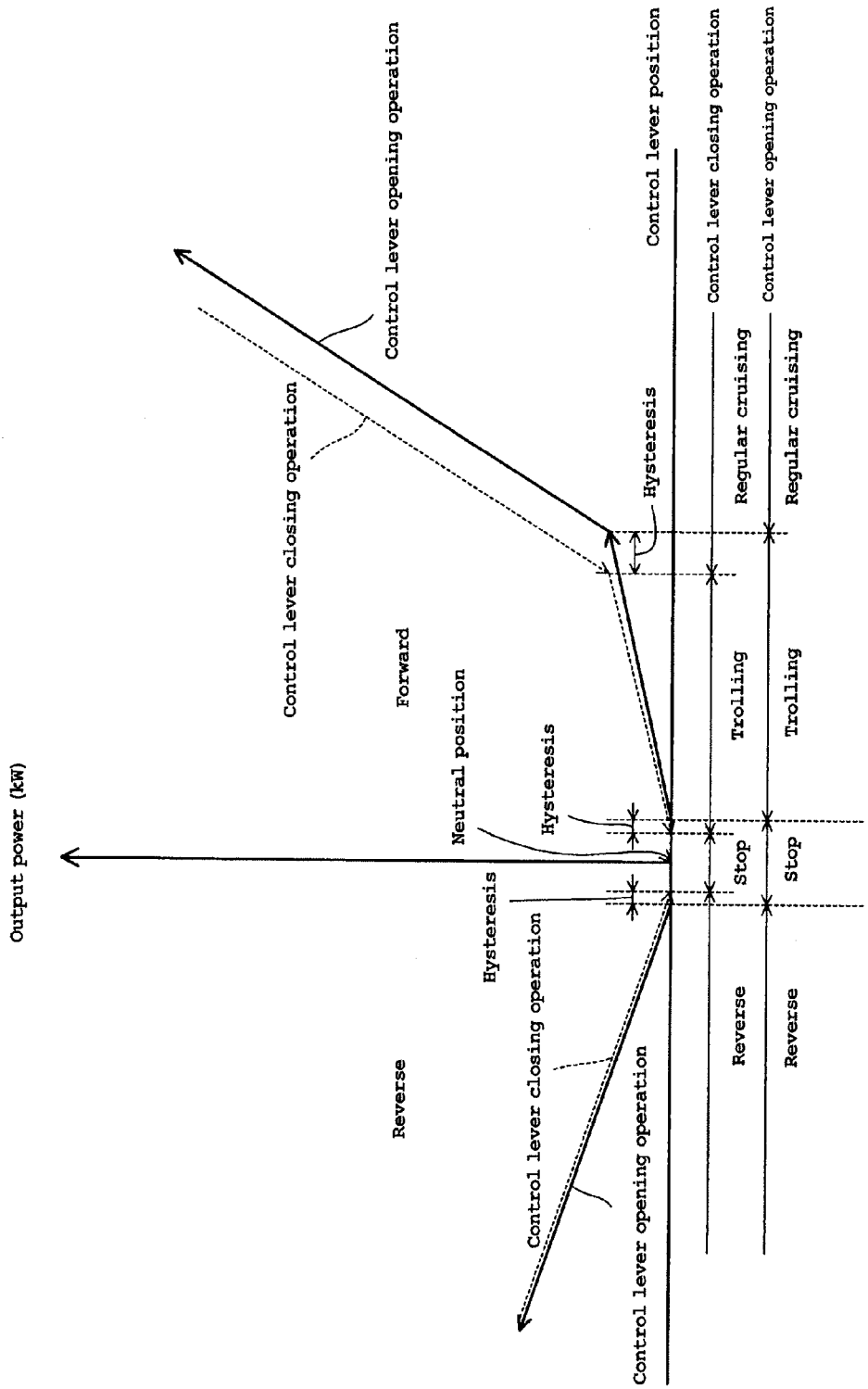
FIG. 3 is a chart showing the corresponding relations between the control lever position and the output power from the source of driving force in accordance with an embodiment.

As shown in FIG. 2, the control lever 46, preferably rotatable in forward and backward, can give an instruction on the types of operating mode (regular cruising, trolling, stop, or reverse) by its lever position, and at the same time, it can give an instruction on the amount of output power from the source of driving force by its lever position, as shown in FIG. 3.

As best shown in FIG. 3, a prescribed range extending in the forward and backward direction around the neutral position of the control lever 46 is a stop mode, a prescribed range in the forward side of the stop mode range is a trolling mode, and a range farther in the forward side of the trolling mode range is a regular cruising mode. Also, a range in the backward section of the stop mode range is a reverse mode. In the illustrated embodiment, variation in the output power from the source of driving force relative to the displacement of the control lever 46 is smaller in the trolling mode compared with that in the regular cruising mode.

In this arrangement, instructions for the types of operating mode and the amount of output power from the source of driving force can be given easily and continuously by the rotating operation of the control lever 46, resulting in the remarkable improvement of the controllability. In addition, it facilitates fine tuning of the output power in the trolling mode, and the speed control in the dead slow speed running.

Further, as shown in FIG. 3, the illustrated embodiment provides so called hysteresis, by which the mode switching position of the control lever 46 is different in the opening operation that moves the control lever farther from the neutral position in comparison with such position in the closing operation to move the control lever closer to the neutral position. In this way, some "play" is provided in the mode switching process, preventing frequent mode switching around the boundary of the abutting modes.

Figure 4:
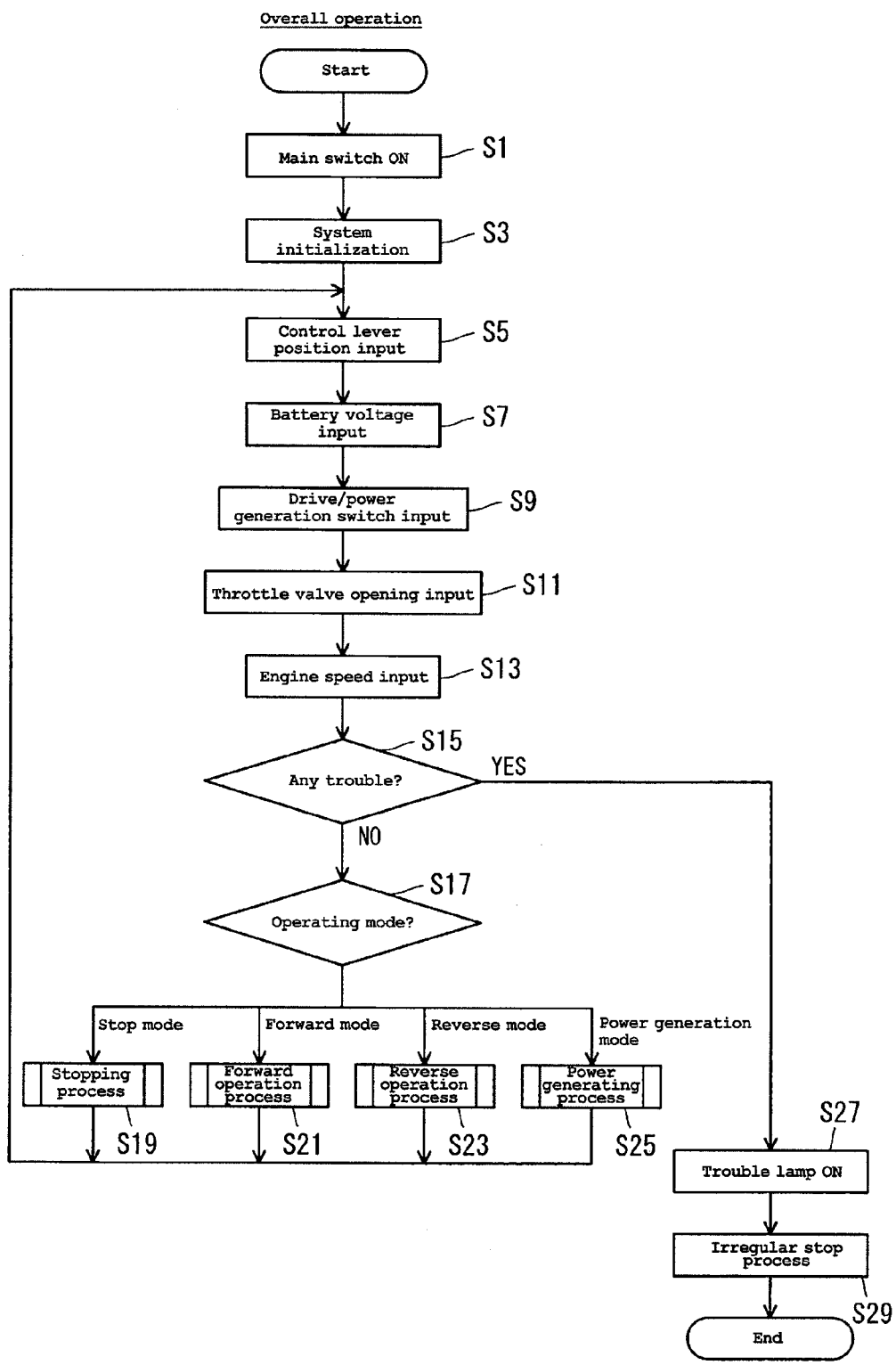
FIG. 4 is a flow chart showing the overall operation of the watercraft propulsion system.

Overall operation of such an embodiment of a watercraft propulsion system will be described with reference to FIG. 4.

First, the system is initialized (step S3) when the main switch 44 is pressed down to the ON state (step S1). The system initialization includes setting of the electromagnetic clutch 22 at OFF state, for instance.

Next, the lever position signal of the control lever 46 is input into the controller 42 (step S5), and the signal indicating the battery voltage detected by the battery voltage sensor 54 is input into the controller 42 (step S7). Further, the setting signal from the drive/power generation switch 48 is input into the controller 42 (step S9), followed by the input of the signal indicating the opening of the throttle valve 34 (throttle position) detected by the throttle opening sensor 40 (step S11), and the input of the signal indicating the engine rpm detected by the engine speed sensor 36 (step S13). The controller 42 in the present embodiment preferably detects any trouble in the watercraft propulsion system 10 based on these input information (step S15), and the operating mode is determined if there is no trouble (step S17).

The stopping process is implemented if the operating mode is the stop mode (step S19), the forward operation process is implemented if it is a forward mode (step S21), the reverse operation process is implemented if it is the reverse mode (step S23), and the power generating process is implemented if it is the power generation mode (step S25). Then, the process returns to the step S5.

On the contrary, if any trouble is detected in the watercraft propulsion system 10 in step S15, the trouble lamp 50 comes on according to the instruction by the controller 42 (step S27), an irregular stop process preferably is implemented (step S29), and the process is terminated.

Figure 5:
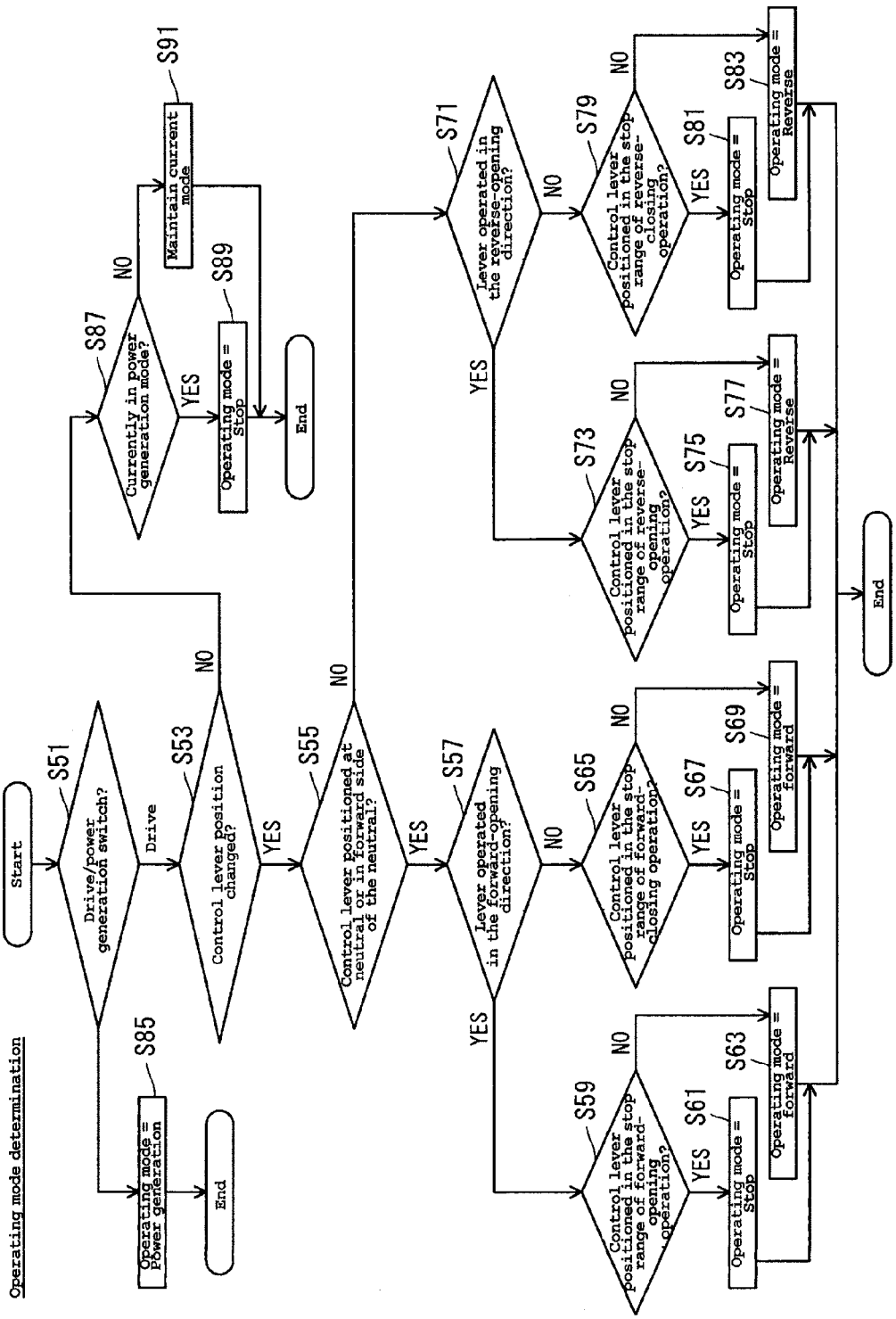
FIG. 5 is a flow chart showing the operating mode determination process in step 17 of FIG. 4.

Operating mode determination process shown as the step S17 in FIG. 4, will next be explained in detail with reference to FIG. 5.

In this embodiment, the controller 42 first determines whether the setting signal from the drive/power generation switch 48 indicates power generation or driving (step S51). If the signal indicates driving, the controller 42 determines whether the position of the control lever 46 has changed or not (step S53). If the lever position has changed, determination is made whether the control lever 46 is at the neutral position or in the forward side of the neutral position (step S55). If the control lever 46 is at the neutral position or in the forward side of the neutral position, then, determination is made whether the operating direction of the control lever 46 is in the forward-opening direction (step S57). The operating direction of the control lever 46 can be determined based on the lever position in the previous control cycle and that in the present control cycle.

If the operating direction of the lever is determined to be in the forward-opening direction in step S57, then determination is made whether the control lever 46 is positioned in the stop range associated with the forward-opening operation (step S59). If the lever is positioned in the stop range, the operating mode is determined to be the stop mode (step S61). On the contrary, if the lever is not positioned in the stop range associated with the forward-opening operation in step S59, the operating mode is determined to be the forward mode (step S63). When the operating mode is determined to be the forward mode, it is initially determined to be the trolling mode, and the forward/reverse switching device 26 is set in the forward mode.

If the operating direction of the control lever 46 is determined to be in the forward-closing direction in step S57, then, determination is made whether the lever is positioned in the stop range associated with the forward-closing operation (step S65). If the lever is positioned in the stop range, the operating mode is determined to be the stop mode (step S67). On the contrary, if the lever is not positioned in the stop range associated with the forward-closing operation in step S65, the operating mode is determined to be the forward mode (step S69).

If the control lever 46 is in the reverse side relative to the neutral position in step S55, then, the process goes to step S71. In step S71, determination is made whether the operating direction of the control lever 46 is in the reverse-opening direction. If it is in the reverse-opening direction, determination is made whether the lever is positioned in the stop range associated with the reverse-opening operation (step S73). If the lever is positioned in the stop range, the operating mode is determined to be the stop mode (step S75). On the contrary, if the lever is not positioned in the stop range associated with the reverse-opening operation in step S73, the operating mode is determined to be the reverse mode (step S77).

If the operating direction of the control lever 46 is determined to be in the reverse-closing direction in step S71, then, determination is made whether the lever is positioned in the stop range associated with the reverse-closing operation (step S79). Then, if the lever is positioned in the stop range, the operating mode is determined to be the stop mode (step S81). On the contrary, if the lever is not positioned in the stop range associated with the reverse-closing operation in step S79, the operating mode is determined to be the reverse mode (step S83).

Further, if the drive/power generation switch 48 is set for power generation in step S51, the operating mode is determined to be the power generation mode (step S85).

If there is no change in the position of the control lever 46 in step S53, determination is made whether the present mode is the power generation mode or not (step S87). If the present mode is the power generation mode, the operating mode is determined to be the stop mode (step S89). On the other hand, if the present mode is not the power generation mode in step S87, then, the present mode is maintained (step S91).

Figure 6:
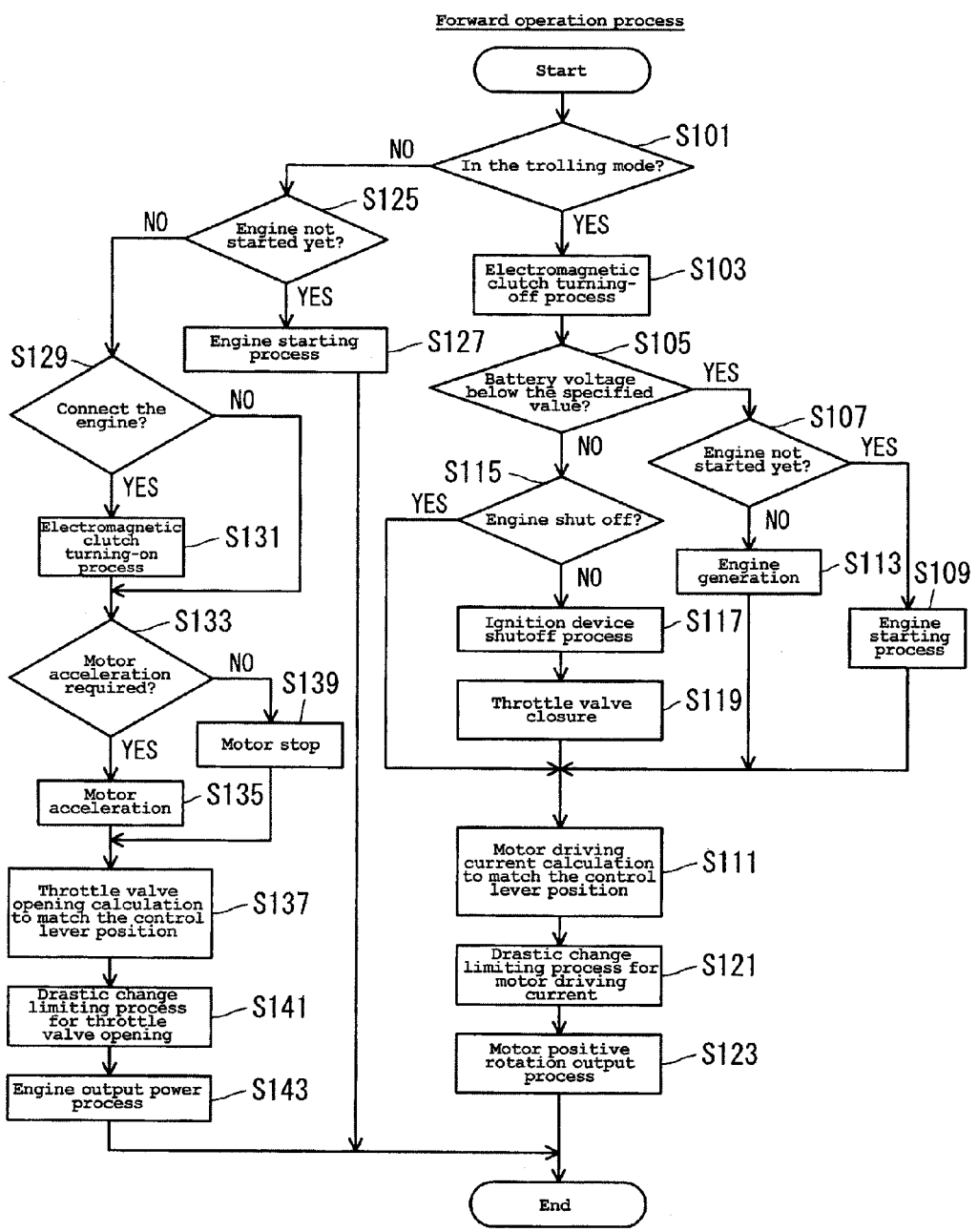
FIG. 6 is a flow chart showing an example of a forward operation process according to an embodiment.

Next, an operation example regarding the forward operation process shown in FIG. 4 as the step S21 will be described with reference to FIG. 6.

First, the controller 42 determines whether the operating mode is the trolling mode or not (step S101). If it is the trolling mode, the controller 42 sets the propeller driving mode to the first mode, in which the propeller 12 is driven by the electric motor 16, and the amount of output power from the electric motor 16 is adjusted according to the instruction given by the control lever 46. In other words, the process goes to step S103, and the following process is implemented.

In step S103, the turning-off process for the electromagnetic clutch 22 is implemented. Then, the controller 42 determines whether the voltage of the battery 52 is below a specified value or not (step S105).

If the battery voltage is below the specified value, the controller 42 determines the motor driving mode to be a third mode, in which the electric motor 16 is driven by electric power from the battery 52, and in parallel, the electric power obtained by the engine generation is charged into the battery 52. In other words, the process goes to step S107. Then, determination is made in step S107 whether the engine has not been started yet. If the engine has not been started yet, the engine starting process is implemented (step S109), and the process goes to step S111.

If the engine has already been started in step S107, the engine speed is controlled to obtain the prescribed amount of power generation, engine generation is implemented (step S113), and then the process goes to step S111.

If the battery voltage exceeds the specified value in step S105, the controller 42 determines the motor driving mode to be in a fourth mode, in which the motor 16 is driven by electric power from the battery 52. In other words, the process goes to step S115. Since the engine start is not required in the fourth mode, determination is made whether the engine 14 is stopping or not in step S115. If the engine 14 is stopping, the process goes to step S111, but if the engine 14 is running, the shutoff process for the ignition device 32 is implemented (step S117), the throttle valve 34 is closed (S119), and then the process goes to S111.

In step S111, the controller 42 calculates the electric motor driving current to be supplied to the electric motor 16, with reference to the table data showing the corresponding relations of FIG. 3, so that the motor output power is obtained in response to the position of the control lever 46. Then, a drastic change limiting process is implemented to prevent the electric motor driving current from changing sharply (step S121), the positive rotation output process for the electric motor 16 is implemented (step S123), and the process is terminated.

If the operating mode is not the trolling mode in step S101, it is determined to be the regular cruising mode. Consequently, the controller 42 sets the propeller driving mode to the second mode in which the propeller 12 is driven by the engine 14 and the amount of output power from the engine 14 is adjusted according to the instruction given by the control lever 46. In other words, the process goes to step S125, and the following process is implemented.

Determination is made in step S125 whether the engine has not been started yet. If the engine has not been started yet, the engine starting process is implemented (step S127), and the process is terminated.

If the engine has already been started in step S125, determination is made whether the engine 14 is to be connected or not, namely, whether the electromagnetic clutch 22 is to be turned on or not (step S129). Here, determination is made by the controller 42 based on the criteria that the engine speed is at or higher than the first prescribed value (1200 rpm, for example) or not. If the engine speed is at or higher than the first prescribed value, it is determined that the engine 14 can be connected, followed by the implementation of the electromagnetic clutch 22 turning-on process (step S131), and the process goes to S133. Preferably the engine 14 and the propeller 12 are joined when the electromagnetic clutch 22 is turned on.

If the engine speed is below the first prescribed value and the condition does not allow the engine 14 to be connected yet in step S129, then, the process goes to step S133 directly.

In step S133, determination is made whether the acceleration of electric motor 16 is required or not. Determination is made by the controller 42 based on the criteria that the speed of the engine 14 is at or higher than the second prescribed value (3000 rpm, for example) or not. If the speed of the engine 14 is below the second prescribed value, it is determined that the acceleration of the electric motor 16 is required, followed by implementing acceleration of the electric motor 16 (step S135), and then the process goes to step S137. If acceleration of the electric motor 16 is determined not to be required in step S133, the electric motor 16 is stopped (step S139), and the process goes to step S137.

In step S137, the controller 42 calculates the opening of the throttle valve 34 with reference to table data showing the corresponding relations of FIG. 3, so that the engine output power is obtained in response to the position of the control lever 46. Then, a drastic change limiting process is implemented to prevent the opening of the throttle valve 34 from changing sharply (step S141), the output power process for the engine 14 is implemented (step S143), and the process is terminated.

According to the operation example described above, instructions for the types of operating mode as well as the amount of output power from the source of driving force can be given easily and continuously by the rotating operation of the single control lever 46, resulting in the simple control of the engine 14 and the electric motor 16. Especially, when the regular cruising mode is switched to the trolling mode by the control lever 46, transition from the propeller being driven by the engine 14 into the propeller being driven by the electric motor 16 can be made smoothly. Further, shifting between the forward operation and the reverse operation can be made easily by the single control lever 46.

Also, exhaust gas and the noise can be suppressed in trolling, because the propeller 12 is driven by the electric motor 20 when instruction is given to run in the trolling mode.

Further, in the first mode, the electric motor 16 is driven by the electric power supplied by the battery 52 when the battery voltage exceeds the specified value, while the motor 16 is driven by the electric power supplied by the battery 52, and in parallel, the electric power obtained by the engine generation is charged into the battery 52 when the battery voltage is below the specified value. In this way, deterioration of the battery 52 due to over discharge can be prevented.

Additionally, in the first mode, when the electric power is supplied by engine generation using the engine 14, with the propeller 12 being separated by turning-off the electromagnetic clutch 22, engine speed can be controlled regardless of the rotational speed of the propeller 12, and an adequate amount of charging power can be obtained.

Further, in the second mode, the engine 14 is connected to the propeller 12 by turning-on the electromagnetic clutch 22 when the speed of the engine 14 exceeds the first prescribed value, thus the engine 14 is connected to the propeller 12 smoothly. Additionally in the second mode, the electric motor 16 is also used to drive the propeller 12 until the speed of the engine 14 reaches the second prescribed value, thus acceleration of the watercraft is improved.

Figure 7:
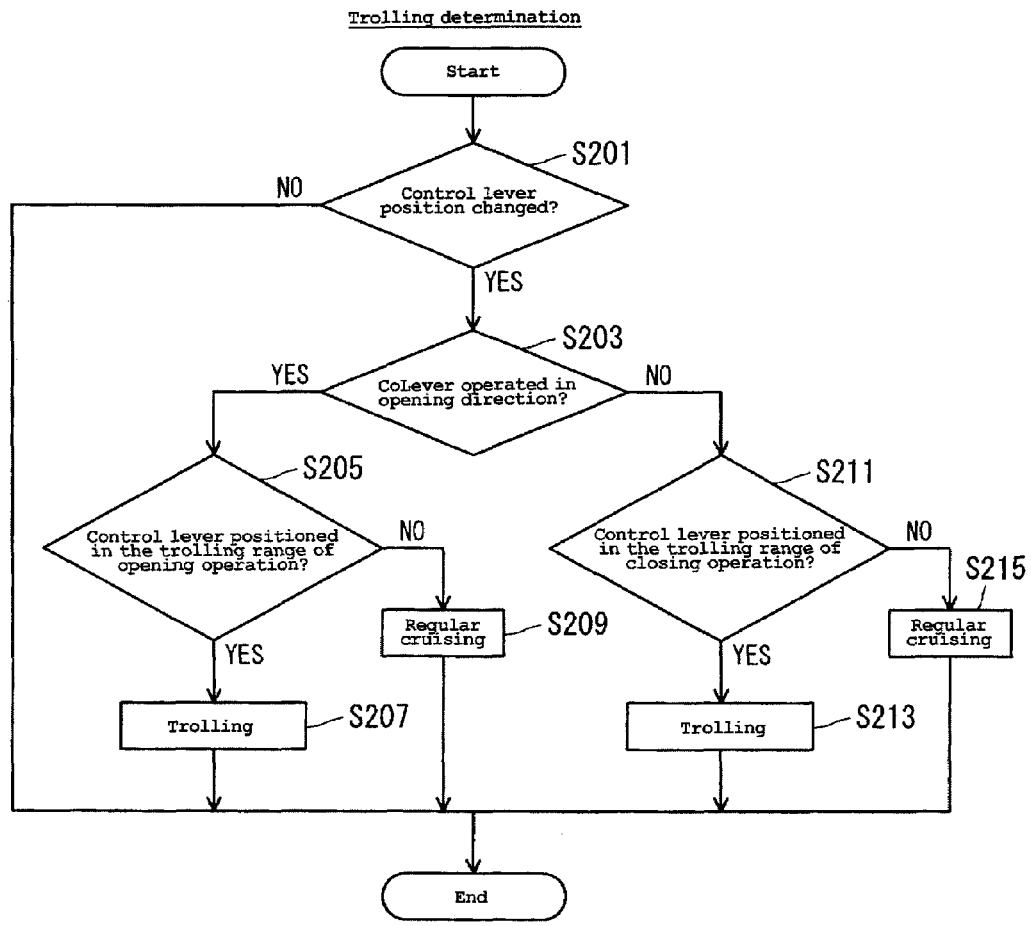
FIG. 7 is a flow chart showing an example of determination process for the trolling operation according to an embodiment.

A preferred determination process to identify the trolling mode operation will be explained next with reference to FIG. 7.

First, the controller 42 determines whether the position of the control lever 46 has changed or not (step S201), and if it has changed, determination is made whether the operating direction of the control lever 46 is in the opening direction (step S203).

If the operating direction of the control lever 46 is in the opening direction, determination is made whether the control lever 46 is positioned in the trolling range associated with the opening operation (step S205), then, if it is in the trolling range, the operating mode is determined to be the trolling mode, and the process is terminated. If the lever is not positioned in the trolling range in step S205, the operating mode is determined to be the regular cruising mode (step S209), and the process is terminated.

If the operating direction of the control lever 46 is determined to be in the closing direction in step S203, determination is made whether the control lever 46 is positioned in the trolling range associated with the closing operation (step S211). If it is in the trolling range, the operating mode is determined to be the trolling mode (step S213), and the process is terminated. If the lever is not positioned in the trolling range in step S211, the operating mode is determined to be the regular cruising mode (step S215), and the process is terminated.

Figure 8:
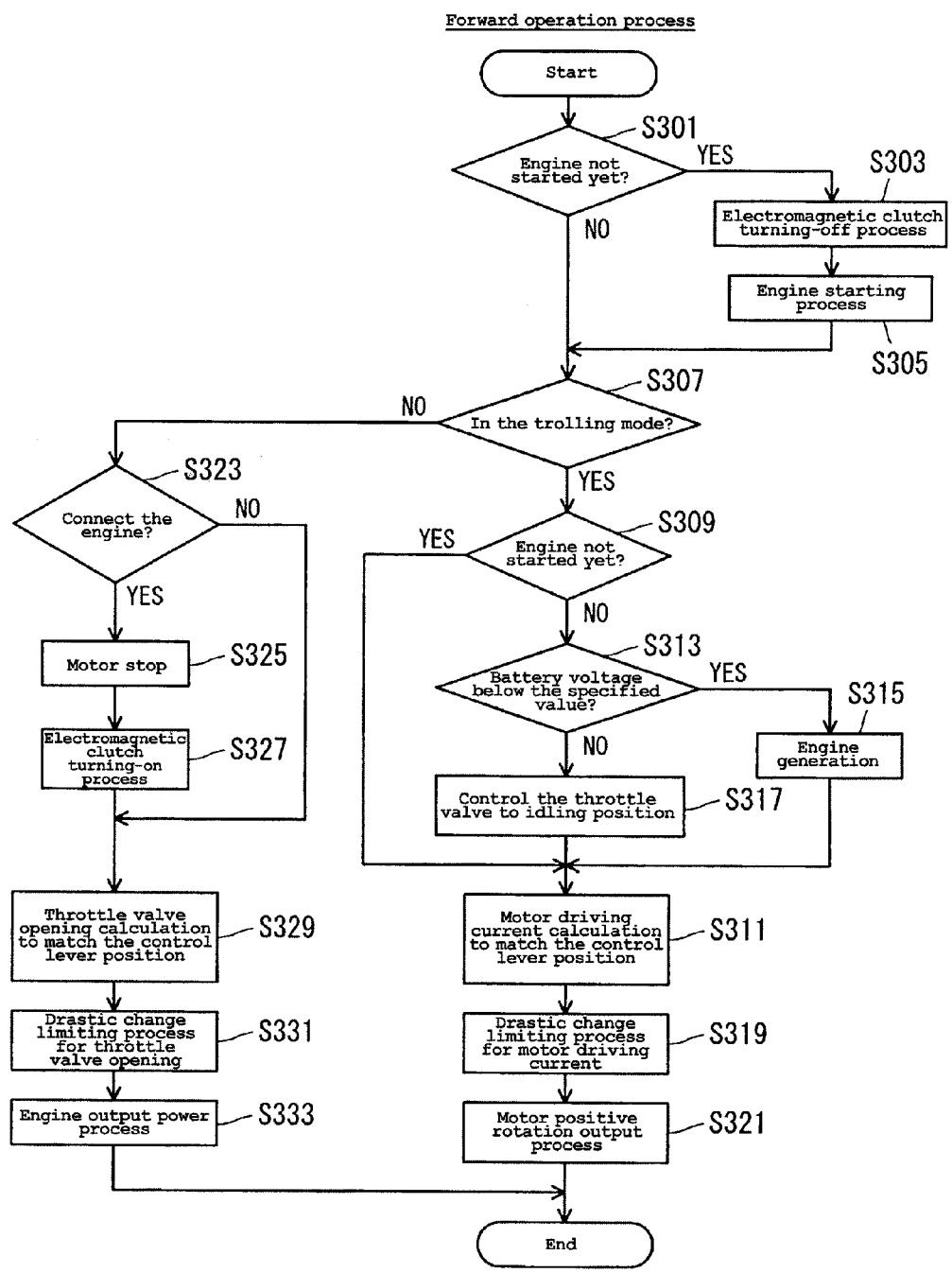
FIG. 8 is a flow chart showing another example of a forward operation process.

Another operation example of an embodiment of the forward operation process will be explained with reference to FIG. 8.

First, determination is made whether the engine 14 has not been started yet (step S301). If the engine has not been started yet, the turning-off process for the electromagnetic clutch 22 is implemented (step S303), the engine starting process is implemented (step S303), and the process goes to step S307. If the engine has already been started in step S301, the process goes to step S307.

In step S307, determination is made whether the operating mode is the trolling mode or not, and if it is the trolling mode, the controller 42 sets the propeller driving mode to the first mode. Then, the process goes to step S309 to make determination whether the engine has not been started yet (step S309). If the engine has not been started yet, the process goes to step S311, while if the engine has already been started, determination is made whether the voltage of the battery 52 is below the specified value or not (step S313). If the battery voltage is below the specified value, the engine generation is implemented (step S315), and the process goes to step S311.

If the battery voltage exceeds the specified value in step S313, the throttle valve 34 is controlled to the idling position by the controller 42 (step S317), and the process goes to step S311.

In step S311, the controller 42 calculates the electric motor driving current with reference to the table data showing the corresponding relations of FIG. 3, so that the motor output power is obtained in response to the position of the operating lever 46. Then, a drastic change limiting process is implemented to prevent the electric motor driving current from changing sharply (step S319), the positive rotation output process for the electric motor 16 is implemented (step S321), and the process is terminated.

If the operating mode is not the trolling mode in step S307, it is determined to be the regular cruising mode. Then, controller 42 sets the propeller driving mode to the second mode, the process goes to step S323, and the determination is made whether the engine 14 is to be connected or not, namely, whether the electromagnetic clutch 22 is to be turned on or not. If the engine speed is at or higher than the first prescribed value, it is determined that the engine 14 can be connected, and the electric motor 16 preferably is stopped (step S325), followed by the implementation of the electromagnetic clutch 22 turning-on process (step S327), then the process goes to S329.

If the engine speed is below the first prescribed value and the condition does not allow the engine 14 to be connected yet in step S323, then the process goes to step S329 directly.

In step S329, the controller 42 calculates the opening of the throttle valve 34 with reference to table data showing the corresponding relations of FIG. 3, so that the engine output power is obtained in response to the position of the control lever 46. A drastic change limiting process is implemented to prevent the opening of the throttle valve 34 from changing sharply (step S331), the output power process for the engine 14 is implemented (step S333), and the process is terminated.

In this operation example, the engine 14 is operated at idle while the electric motor 16 is driven by the electric power from the battery 52 in the first mode, allowing swift transition to the second mode without re-starting the engine 14 thereafter.

Figure 9:
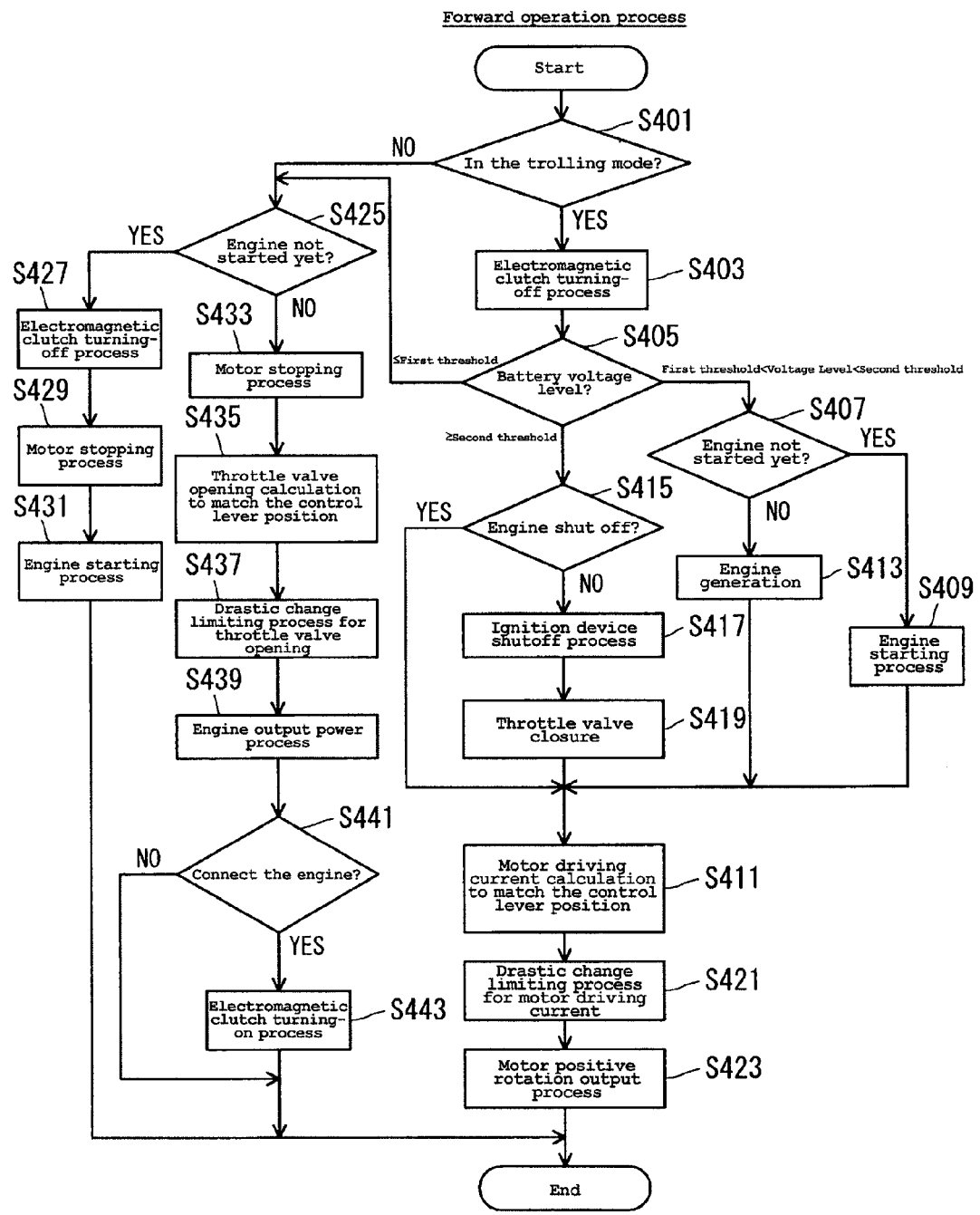
FIG. 9 is a flow chart showing still another example of a forward operation process.

Another operation example of an embodiment of the forward operation process will be explained with reference to FIG. 9.

First, determination is made whether the operating mode is the trolling mode or not (step S401), and if it is the trolling mode, the turning-off process for the electromagnetic clutch 22 is implemented (step S403). Then the controller 42 compares the voltage of the battery 52 with the first threshold and the second threshold (step S405). When the first threshold is below the battery voltage (first threshold <battery voltage), the controller 42 sets the propeller driving mode to the first mode.

When the first threshold is below the battery voltage and the battery voltage is below the second threshold (first threshold <battery voltage <second threshold), the controller 42 determines the motor driving mode to be the third mode, and a determination is made whether the engine has not been started yet (step S407). If the engine has not been started yet, the engine starting process is implemented (step S409), and the process goes to step S411.

If the engine has already been started in step S407, the engine speed is controlled to obtain the prescribed amount of power generation, the engine generation is implemented (step S413), and then, the process goes to step S111.

When the battery voltage is equal or larger than the second threshold (battery voltage≧second threshold) in step S405, then, the controller 42 determines the motor driving mode to be the fourth mode, and the determination is made whether the engine 14 is shut off (step S415). If the engine 14 is stopped or stopping, the process preferably goes to step S411, but if the engine 14 is running, the shutoff process for the ignition device 32 is implemented (step S417), the throttle valve 34 is closed (S419), and the process goes to S411.

In step S411, the controller 42 calculates the electric motor driving current with reference to table data showing the corresponding relations of FIG. 3, so that the motor output power is obtained in response to the position of the operating lever 46. The drastic change limiting process is implemented to prevent the electric motor driving current from changing sharply (step S421), the positive rotation output process for the electric motor 16 is implemented (step S423), and the process is terminated.

If the operating mode is not the trolling mode but the regular cruising mode in step S401, or if the battery voltage is equal to or less than the first threshold (battery voltage≦first threshold) in step S405 even though the operating mode is the trolling mode, the controller 42 sets the propeller driving mode to the second mode, the process goes to S425, and the determination is made whether the engine has not been started yet. If the engine has not been started yet, the turning-off process for the electromagnetic clutch 22 is implemented (step S427), the stopping process for the electric motor 16 is implemented (step S429), the engine starting process is implemented (S431), and the process is terminated.

If the engine has already been started in step S425, the electric motor stopping process is implemented (step S433). Then, the controller 42 calculates the opening of the throttle valve 34 with reference to the table data showing the corresponding relations of FIG. 3, so that the engine output power is obtained in response to the position of the control lever 46 (step S435), the drastic change limiting process is implemented to prevent the opening of the throttle valve 34 from changing sharply (step S437), and the output power process for the engine 14 is implemented (step S439). Then, determination is made whether the engine 14 is to be connected or not, namely, whether the electromagnetic clutch 22 is to be turned on or not (step S442). If the engine speed is at or higher than the first prescribed value, it is determined that the engine 14 can be connected, followed by the implementation of the electromagnetic clutch 22 turning-on process (step S443), and the process is terminated. On the other hand, if the engine speed is below the first prescribed value and the condition does not allow the engine 14 to be connected yet in step S441, the process is terminated.

According to this operation example, the propeller drive mode is set to the first mode or to the second mode taking account of not only the operating mode, but also comparison between the battery voltage and the first threshold. For instance, even if the operating mode is instructed to be the trolling mode, sometimes it is hard to drive the propeller 12 by the electric motor 16 in the first mode when the battery voltage is equal to or below the first threshold (battery voltage≦first threshold). In such cases, the second mode can be used to drive the propeller 12.

Also in the first mode, the electric motor 16 is driven by the electric power from the battery 52 when the battery voltage is equal to or larger than the second threshold (battery voltage≦second threshold), or the electric motor 16 is driven by the battery while the battery is being charged by the engine generation when the first threshold is less than the battery voltage, and the battery voltage is less than the second threshold (first threshold<battery voltage<second threshold). Thus, deterioration of the battery due to over discharge can be prevented in this embodiment.

Figure 10:
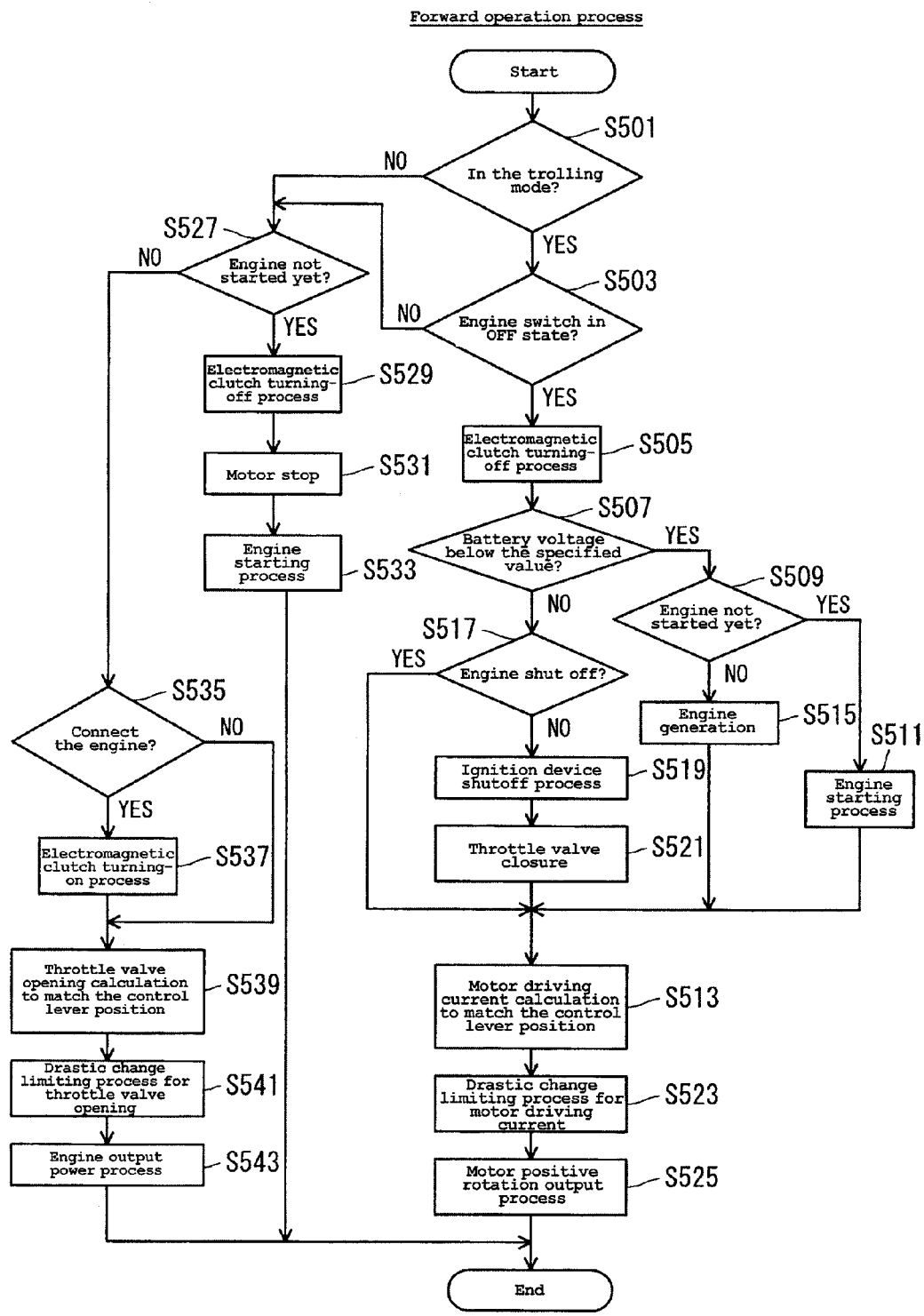
FIG. 10 is a flow chart showing further still another example of forward operation process.

Still another operation example of an embodiment of the forward operation process will be explained with reference to FIG. 10.

In this embodiment, the engine watercraft propulsion system 10 is further provided with an engine switch 56 connected to the controller 42 as shown in FIG. 1. The engine switch 56 represents a switching means to change between using or not using the electric motor 16 for driving the propeller.

First, the controller 42 determines whether the operating mode is the trolling mode or not (step S501), and if it is the trolling mode, determination is made whether the engine switch 56 is turned off or not (step S503). If the engine switch 56 is turned off, the controller 42 sets the propeller driving mode to the first mode. The process goes to S505, and the turning-off process for the electromagnetic clutch 22 is implemented. Further, the determination is made whether the voltage of the battery 52 is below the specified value or not (step S507). If the battery voltage is below the specified value, the controller 42 determines the motor driving mode to be the third mode, and the determination is made whether the engine has not been started yet (step S509). If the engine has not been started yet, the engine starting process is implemented (step S511), and the process goes to step S513.

If the engine has already been started in step S509, the engine speed is controlled to obtain the prescribed amount of power generation, the engine generation is implemented (step S515), and then the process goes to step S513.

If the battery voltage exceeds the specified value in step S405, then the controller 42 determines the motor driving mode to be the fourth mode, and the determination is made whether the engine 14 is stopped (step S517). If the engine 14 is stopping or has stopped, the process goes to step S513, but if the engine 14 is running, the shutoff process for the ignition device 32 is implemented (step S519), the throttle valve 34 is closed (S521), and then the process goes to S513.

In step S513, the controller 42 calculates the electric motor driving current with reference to the table data showing the corresponding relations of FIG. 3, so that the motor output power is obtained in response to the position of the operating lever 46. A drastic change limiting process is implemented to prevent the electric motor driving current from changing sharply (step S523), the positive rotation output process for the electric motor 16 is implemented (step S525), and the process is terminated.

If the operating mode is not the trolling mode but the regular cruising mode, or if the engine switch 56 is turned on in step S503 even though the operating mode is the trolling mode, the controller 42 sets the propeller driving mode to the second mode, the process goes to S527, and the determination is made whether the engine has not been started yet (step S527). If the engine has not been started yet in step S527, the turning-off process for the electromagnetic clutch 22 is implemented (step S529), the electric motor 16 is stopped (step S531), the engine starting process is implemented (step S533), and the process is terminated.

If the engine has already been started in step S527, determination is made whether the engine 14 is to be connected or not, namely, whether the electromagnetic clutch 22 is to be turned on or not (step S535). If the engine speed is at or higher than the first prescribed value, it is determined that the engine 14 can be connected, followed by the implementation of the electromagnetic clutch 22 turning-on process (step S537), and the process goes to S539.

If the engine speed is below the first prescribed value, the condition does not allow the engine 14 to be connected yet in step S535. The process then goes to step S539 directly.

In step S539, the controller 42 calculates the opening of the throttle valve 34 with reference to the table data showing the corresponding relations of FIG. 3, so that the engine output power is obtained in response to the position of the control lever 46. Then, the drastic change limiting process is implemented to prevent the opening of the throttle valve 34 from changing sharply (step S541), the output power process for the engine 14 is implemented (step S543), and the process is terminated.

According to this operation example, if the engine switch 56 is turned on in advance to avoid the use of electric motor 16, the propeller 12 can be driven in the second mode, namely driven by the engine 14, even if the operating mode is the trolling mode, allowing a flexible response to the operator's demand.

A watercraft propulsion system 10a according to yet another embodiment of the present invention will be described with reference to FIG. 11.

The illustrated watercraft propulsion system 10a is configured as the motor on top type in which the electric motor 16 is provided on the top of the engine 14 without using an electromagnetic clutch. In addition, the driveshaft 24 is joined to the lower end of the crankshaft 8 of the engine 14, the rotor 20 of the electric motor 16 is joined to the upper end of the crankshaft 18, and the electric generator body 28 is provided on the upper end of the rotor 20. A program for implementing the operations shown in FIGS. 12 through 14, and other items are stored in the memory 42a. The controller 42 preferably represents the setting means and the third to the fourth determination means. The rest of the configuration preferably is the same or similar to the watercraft propulsion system 10 described above, and the description for the duplicated part will be skipped.

Figure 12:
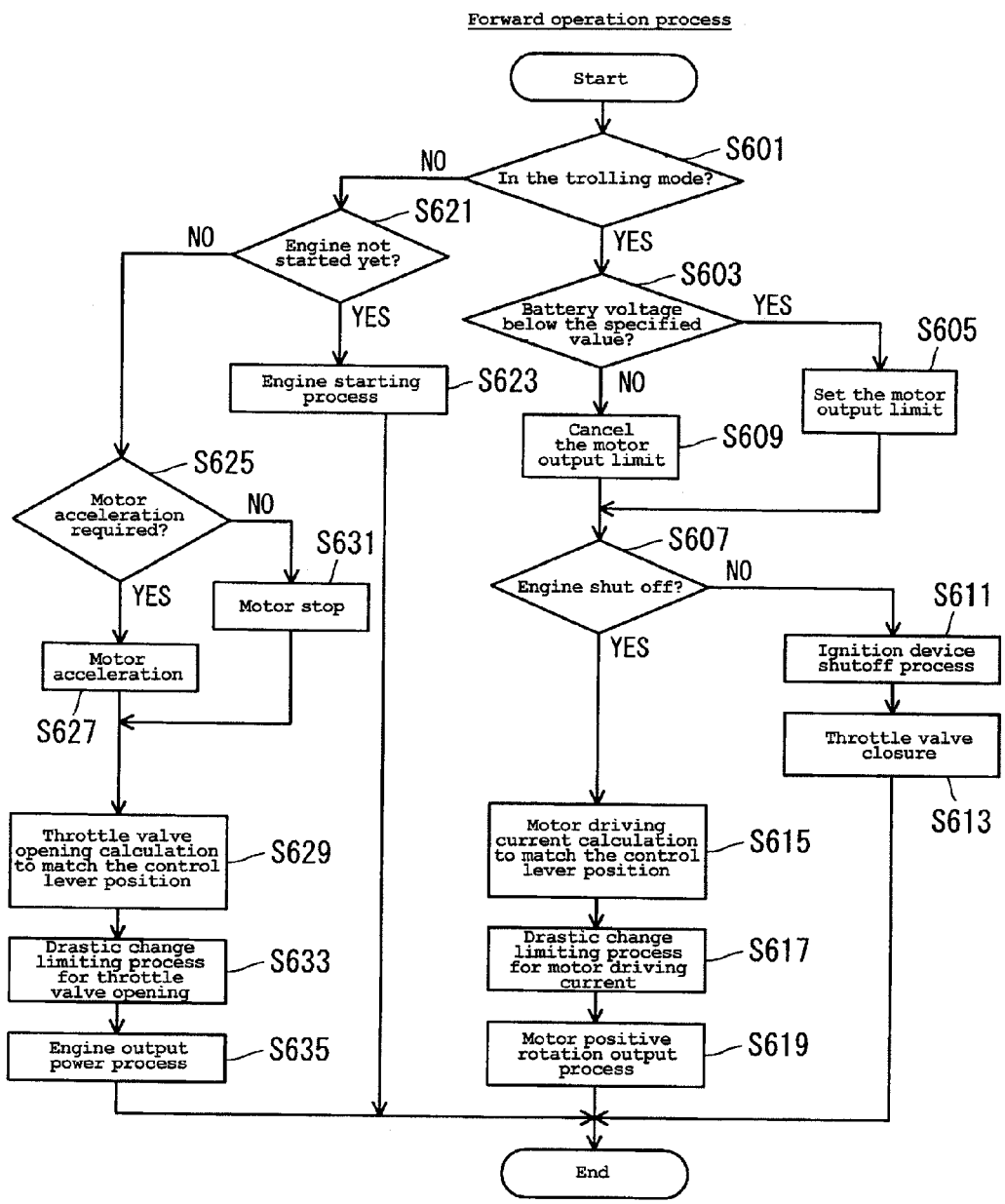
FIG. 12 is a flow chart showing an example of the forward operation process according to the embodiment of FIG. 11.

An operation example regarding the forward operation process of the watercraft propulsion system 10a will be described with reference to FIG. 12.

First, determination is made whether the operating mode is the trolling mode or not (step S601). If it is the trolling mode, the controller 42 sets the propeller driving mode to the first mode, the process goes to S603, and the controller 42 determines whether the voltage of the battery 52 is below specified value or not (step S603).

If the battery voltage is below the specified value, the controller 42 determines that the motor driving mode be in a fifth mode, in which the output power of the electric motor 16 is restricted so that it is driven by the electric power from the battery 52. In other words, the process goes to step S605. The restriction on the output power of the electric motor 16 is set in step S605, and the process goes to step S607.

If the battery voltage is not below the specified value, the controller 42 determines the motor driving mode to be a sixth mode, in which the electric motor 16 is driven by the electric power from the battery 52 without restricting the output power of the electric motor 16. In other words, the process goes to step S609. The restriction on the output power of the electric motor 16 is removed in step S609, and the process goes to step S607.

In step S607, determination is made whether the engine 14 is shut off or not. If the engine 14 is running, the shutoff process for the ignition device 32 is implemented (step S611), the throttle valve 34 is closed (S613), and the process is terminated.

If the engine 14 is shut off in step S607, the controller 42 calculates the electric motor driving current with reference to the table data showing the corresponding relations of FIG. 3, so that the motor output power is obtained in response to the position of the operating lever 46 (step S615). A drastic change limiting process for motor driving current is implemented (step S617), the positive rotation output process for the electric motor 16 is implemented (step S619), and the process is terminated.

If the operating mode is not the trolling mode in step S601, it is determined to be the regular cruising mode. The controller 42 then sets the propeller driving mode to the second mode, the process goes to step S621, and the determination is made whether the engine has not been started yet. If the engine has not been started yet, the engine starting process is implemented (step S623) using the electric motor 16 provided on the top of the engine 14 as a starter motor, and then, the process is terminated.

If the engine has already been started in step S621, determination is made whether the acceleration of the electric motor 16 is required or not. If the acceleration of the electric motor 16 is required, the electric motor 16 is accelerated (step S627) and the process goes to S629. If the acceleration of the electric motor 16 is not required in step S625, the electric motor 16 is stopped (step S631), and the process goes to step S629.

In step S629, the controller 42 calculates the opening of the throttle valve 34 with reference to the table data showing the corresponding relations of FIG. 3, so that the engine output power is obtained in response to the position of the control lever 46. A drastic change limiting process is implemented to prevent the opening of the throttle valve 34 from changing sharply (step S633), the output power process for the engine 14 is implemented (step S635), and the process is terminated.

According to this operation example, the propeller 12 can be driven without fail by adjusting the output power of the electric motor 16 in response to the battery voltage in the first mode, and the trolling operation can be implemented by the electric motor 16.

Figure 13:
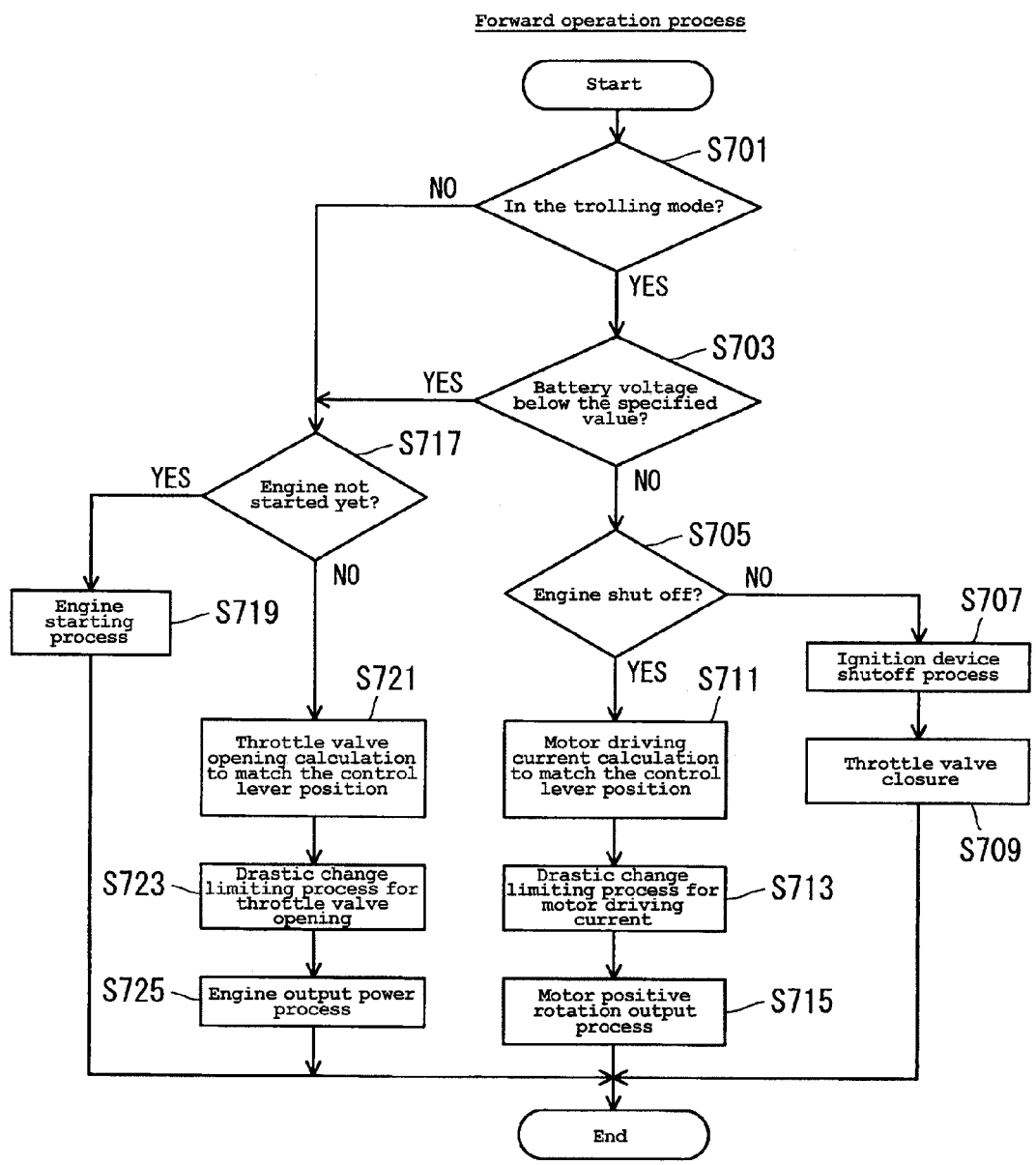
FIG. 13 is a flow chart showing another example of a forward operation process.

Another operation example regarding an embodiment of the forward operation process will be explained with reference to FIG. 13.

First, determination is made whether the operating mode is the trolling mode or not (step S701). If it is in the trolling mode, the process goes to S703, and the controller 42 determines whether the voltage of the battery 52 is below a specified value or not. If the battery voltage exceeds the specified value, the controller 42 sets the propeller driving mode to the first mode, and the determination is made whether the engine 14 is stopped or not (step S705). If the engine 14 is running, the shutoff process for the ignition device 32 is implemented (step S707), the throttle valve 34 is closed (S709), and the process is terminated.

If the engine 14 is stopped in step S705, the controller 42 calculates the electric motor driving current with reference to the table data showing the corresponding relations of FIG. 3, so that the motor output power is obtained in response to the position of the operating lever 46 (step S711). Then, a drastic change limiting process for motor driving current is implemented (step S713), the positive rotation output process for the electric motor 16 is implemented (step S715), and the process is terminated. In still another embodiment, after step S709, the process may progress to step S711.

If the operating mode is not the trolling mode but the regular cruising mode in step S701, or if the battery voltage is equal to or less than the specified value (battery voltage≦specified value) in step S703 even though the operating mode is the trolling mode, the controller 42 sets the propeller driving mode to the second mode, the process goes to S717, and the determination is made whether the engine has not been started yet. If the engine has not been started yet, the engine starting process is implemented (step S719), preferably using the electric motor 16 provided on the top of the engine 14 as a starter motor, and then the process is terminated. In another embodiment, after step S719 the process moves to step S721, discussed below.

If the engine has already been started in step S717, the controller 42 calculates the opening of the throttle valve 34 with reference to the table data showing the corresponding relations of FIG. 3, so that the engine output power is obtained in response to the position of the control lever 46 (step S721). A drastic change limiting process is implemented to prevent the opening of the throttle valve 34 from changing sharply (step S723), the output power process for the engine 14 is implemented (step S725), and the process is terminated.

According to this operation example, the propeller drive mode is set to the first mode or to the second mode taking account of not only the operation mode, but also comparison between the battery voltage and the specified value. For instance, even if the operating mode is instructed to be the trolling mode, sometimes it is hard to drive the propeller 12 by the electric motor 16 using the first mode when the battery voltage is equal to or below the specified value (battery voltage≦specified value). In such cases, the second mode can be used to drive the propeller 12.

Figure 14:
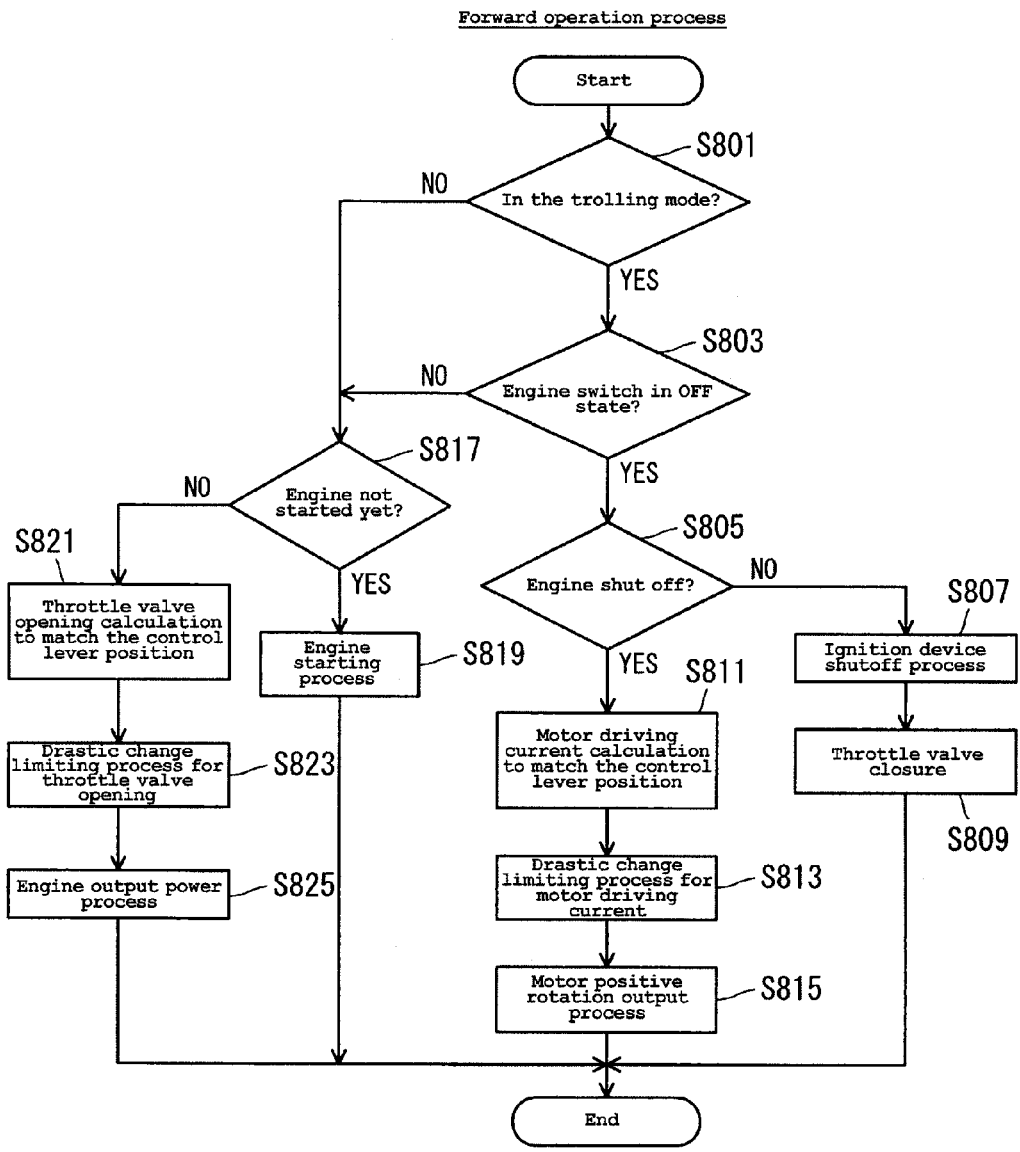
FIG. 14 is a flow chart showing still another example of a forward operation process.

Still another operation example regarding a still further embodiment of the forward operation process will be explained with reference to FIG. 14.

Figure 11:
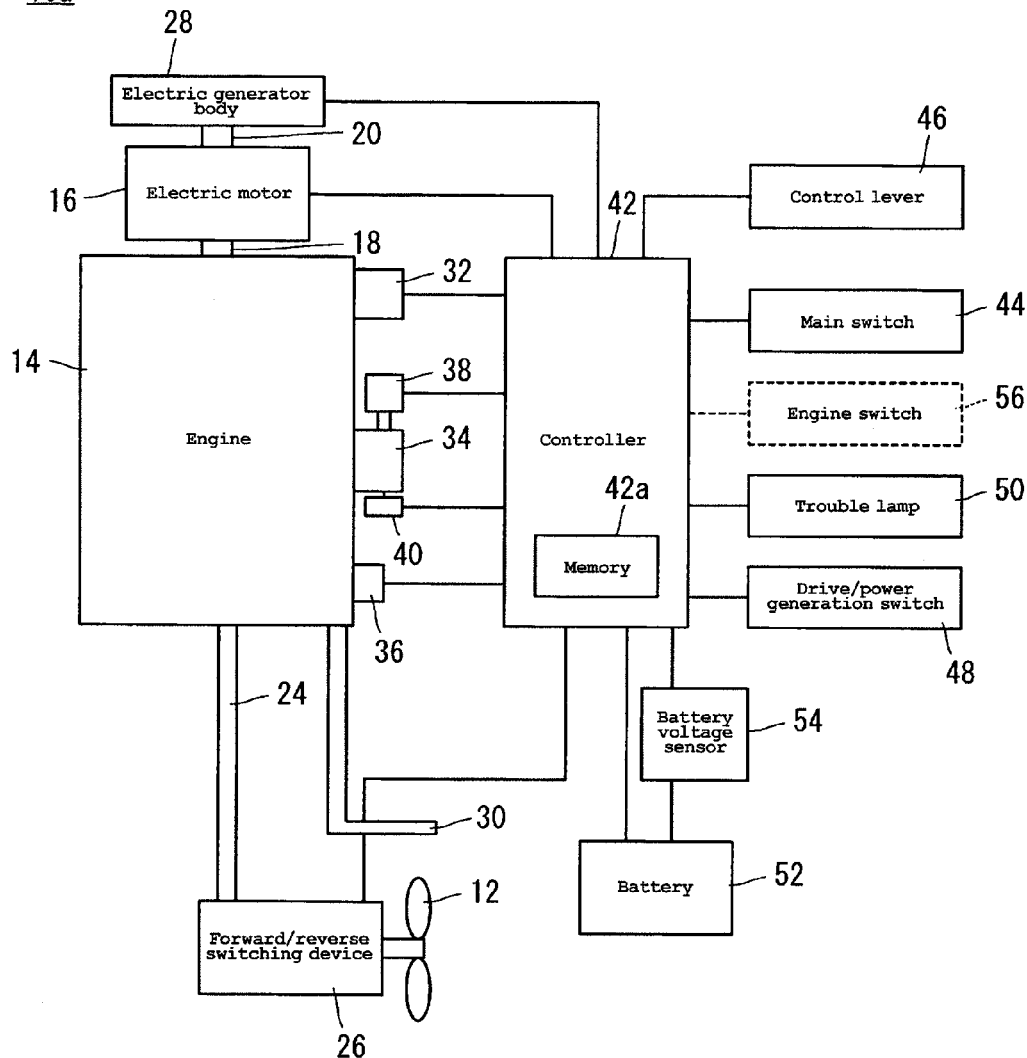
FIG. 11 is a schematic illustration showing a watercraft propulsion system according to still another embodiment.

To implement this operation, the watercraft propulsion system 10a is further provided with an engine switch 56 connected to the controller 42 as shown in phantom in FIG. 11.

First, determination is made whether the operating mode is the trolling mode or not (step S801), and if it is the trolling mode, determination is made whether the engine switch 56 is turned off or not (step S803). If the engine switch 56 is turned off, the controller 42 sets the propeller driving mode to the first mode, the process goes to S805, and determination is made whether the engine 14 is shut off or not. If the engine 14 is running, the shutoff process for the ignition device 32 is implemented (step S807), the throttle valve 34 is closed (S809), and the process is terminated.

If the engine 14 is stopped in step S805, the controller 42 calculates the electric motor driving current with reference to the table data showing the corresponding relations of FIG. 3, so that the motor output power is obtained in response to the position of the operating lever 46 (step S811). Then, a drastic change limiting process is implemented to prevent the electric motor driving current from changing sharply (step S813), the positive rotation output process for the electric motor 16 is implemented (step S815), and the process is terminated. In another embodiment, after step S809 the process moves to step S811.

If the operating mode is not the trolling mode but the regular cruising mode in step S801, or if the engine switch 56 is turned on in step S803 even though the operating mode is the trolling mode, the controller 42 sets the propeller driving mode to the second mode, the process goes to S817, and the determination is made whether the engine has not bee started yet (step S817). If the engine has not been started yet, the engine starting process is implemented (step S819) preferably using the electric motor 16 provided on the top of the engine 14 as a starter motor, and the process is terminated.

If the engine has already been started in step S817, the controller 42 calculates the opening of the throttle valve 34 with reference to the table data showing the corresponding relations of FIG. 3, so that the engine output power is obtained in response to the position of the control lever 46 (step S821). The drastic change limiting process preferably is implemented to prevent the opening of the throttle valve 34 from changing sharply (step S823), the output power process for the engine 14 is implemented (step S825), and the process is terminated.

According to this operation example, if the engine switch 56 is turned on in advance to avoid the use of electric motor 16, the propeller 12 can be driven in the second mode, namely driven by the engine 14, even if the operating mode is the trolling mode, allowing a flexible response to the operator's demand.

It is to be understood that the instruction means may have structure different than as in the embodiments discussed herein. For example, a joystick, knob, thumb-slide or the like and employ principles discussed herein.

Also, the battery voltage sensor 54 is used as the charge level detector in the embodiments described above, however, the charge level detector is not limited to the battery voltage sensor 54, but some other means may be employed which detects the battery charge level based on the electric current and the elapsed time, for instance.

In a preferred embodiment, the principles discussed above are incorporated into an outboard motor. However, other watercraft propulsion systems can use these principles. For example, inboard motor systems and stern drives are also contemplated.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. For example, it is contemplated that motors having somewhat different structure than in the illustrated embodiments could be used, and variations of the operational flow charts surely could be made while still employing inventive principles. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A watercraft propulsion system comprising an engine and an electric motor that are both configured to selectively drive a propeller, the system comprising a user instruction device and a controller, the user instruction device configured so that a user can select a first or second forward operating mode and an output power within the selected operating mode, the controller adapted to receive a signal from the instruction device indicative of the desired operating mode and output power and to control the engine and electric motor accordingly, wherein the controller is configured to employ the electric motor to drive the propeller when the first forward operating mode is selected, and the controller is configured to employ the engine to drive the propeller when the second forward operating mode is selected.

2. A watercraft propulsion system as in claim 1, wherein the user instruction device comprises a control lever, and the position of the control lever simultaneously determines the selected operating mode and selected output power within the selected mode.

3. A watercraft propulsion system as in claim 2, wherein the control lever is rotatable about an axis, and the position of the control lever is controllable by one hand.

4. A watercraft propulsion system as in claim 2, wherein the first forward operation mode is a trolling mode, and the second forward operation mode is a regular cruising mode.

5. A watercraft propulsion system as in claim 3, wherein the controller is configured so that a variation of the electric motor output power corresponding to a change in position of the control lever in the trolling mode is less than a variation of the engine output power corresponding to a change in position of the control lever in the regular cruising mode.

6. A watercraft propulsion system as in claim 1 additionally comprising a battery for storing electric power to be supplied to the electric motor, a charge level detector configured to detect a charge level in the battery, and an electricity generator adapted to be driven by the engine to charge the battery, wherein the charge level detector communicates with the controller, and wherein the controller is configured to determine based on the detected charge level whether the engine should be run during the first forward operating mode in order to charge the battery.

7. A watercraft propulsion system as in claim 6, wherein a connection between the engine and the propeller is disengaged in the first forward operating mode.

8. A watercraft propulsion system as in claim 1 additionally comprising an engine speed detector adapted to communicate an engine speed to the controller, wherein the controller is configured to couple the engine to the propeller only when the engine exceeds a threshold engine speed.

9. A watercraft propulsion system as in claim 8, wherein the controller is configured to run the electric motor in addition to the engine during the second forward operation mode when the engine speed is below a second threshold value.

10. A watercraft propulsion system as in claim 1, wherein the engine is operated at idle when the electric motor is driven by electric power from the battery in the first forward operating mode.

11. A watercraft propulsion system as in claim 1 additionally comprising a battery for storing electric power to be supplied to the electric motor, a charge level detector configured to detect a charge level in the battery, and an electricity generator adapted to be driven by the engine to charge the battery, wherein the charge level detector communicates with the controller, and wherein the controller is configured so that if the detected charge level is below a threshold level when the electric motor is driving the propeller in the first forward operating mode, the controller restricts the output power of the electric motor.

12. A watercraft propulsion system as in claim 1 additionally comprising a battery for storing electric power to be supplied to the electric motor, a charge level detector configured to detect a charge level in the battery, and an electricity generator adapted to be driven by the engine to charge the battery, wherein the charge level detector communicates with the controller, and wherein the controller is configured so that if the detected charge level is below a threshold level when the electric motor is driving the propeller in the first forward operating mode, the controller simultaneously runs the electricity generator to charge the battery.

13. A watercraft propulsion system comprising an engine and an electric motor that are both configured to selectively drive a propeller, the system comprising a user instruction device, a drive source switch, and a controller, the user instruction device configured so that a user can select a first or second forward operating mode and an output power within the selected operating mode, the controller adapted to receive a signal from the instruction device indicative of the desired operating mode and output power and to control the engine and electric motor accordingly, wherein when the drive source switch is in a first position the controller is configured to employ the electric motor to drive the propeller when the first forward operating mode is selected and to employ the engine to drive the propeller when the second forward operating mode is selected, and wherein when the drive source switch is in a second position the controller is configured to employ the engine to drive the propeller when either the first or second forward operating mode is selected.

14. A watercraft propulsion system as in claim 13, wherein the first forward operation mode is a trolling mode, and the second forward operation mode is a regular cruising mode.

15. A watercraft propulsion system as in claim 14, wherein the controller is configured so that a variation of the engine output power corresponding to a change in position of the control lever in the trolling mode is less than a variation of the engine output power corresponding to a change in position of the control lever in the regular cruising mode.

16. A method for operating a watercraft propulsion system comprising an engine and an electric motor that are both configured to selectively drive a propeller and which are controlled by a controller, the method comprising receiving a user instruction selecting one of at least a first and second forward operating mode and selecting an output power in the selected operating mode, and if the first forward operating mode is selected, sensing a battery charge level and, if the sensed battery charge level is above a threshold level, driving the propeller with the electric motor, and if the second forward operating mode is selected, driving the propeller with the engine.

17. A method as in claim 16, wherein if the first forward operating mode is selected and the sensed battery charge level is below a second threshold, the electric motor is operated at a restricted output power level.

18. A method as in claim 16 additionally comprising an electricity generator powered by the engine, wherein if the first forward operating mode is selected and the sensed battery charge level is below a second threshold, the engine is operated to drive the electricity generator simultaneously as the electric motor drives the propeller.

19. A method as in claim 16 additionally comprising operating the engine at idle when the electric motor is driving the propeller in the first forward operating mode.

20. A method as in claim 16 additionally comprising operating the electric motor simultaneously with the engine in the second forward operating mode when an engine speed of the engine is below a threshold level.

* * * * *

UNITED STATES PATENT AND TRADEMARK OFFICE
CERTIFICATE OF CORRECTION

PATENT NO. : 7,473,149 B2
APPLICATION NO. : 11/841652
DATED : January 6, 2009
INVENTOR(S) : Takashi Mizokawa It is certified that error appears in the above-identified patent and that said Letters Patent is hereby corrected as shown below:

In column 12, line 24, Change "voltage$\leqq$second threshold)," to --voltage$\geqq$second threshold),--.

Signed and Sealed this

Twentieth Day of April, 2010

David J. Kappos
*Director of the United States Patent and Trademark Office*